United States Patent [19]

Pratt

[11] 4,380,336
[45] Apr. 19, 1983

[54] BIRD HOUSE AND METHOD OF MAKING SAME

[76] Inventor: Charles D. Pratt, Matinicus Island, Me. 04851

[21] Appl. No.: 306,088

[22] Filed: Sep. 28, 1981

[51] Int. Cl.³ .............................................. A63F 9/12
[52] U.S. Cl. .................................... 273/157 R; 46/17; 144/359; 144/367
[58] Field of Search ................... 273/156, 157 R, 160; 46/17; 144/359, 367, 344, 345, 355

[56] References Cited

U.S. PATENT DOCUMENTS

| | | | |
|---|---|---|---|
| 679,277 | 7/1901 | Cornell | 144/359 X |
| 2,751,706 | 6/1956 | Metal | 46/17 X |
| 2,771,110 | 11/1956 | Tuck | 46/17 UX |
| 3,903,943 | 9/1975 | Hasenwinkle | 144/367 X |

Primary Examiner—Anton O. Oechsle
Attorney, Agent, or Firm—Holland, Armstrong, Wilkie & Previto

[57] ABSTRACT

A method is described for manufacturing articles from solid member using a series of cuts whereby a finished article such as a hollow bird house or other article is formed by an efficient and material saving process. The method is characterized by the use of a number of successive generally straight cuts so that the method is simple and produces only a minimal amount of waste of the material used. A typical example of the process comprises the forming of a hollow bird house or similar article from a section of a log.

6 Claims, 12 Drawing Figures

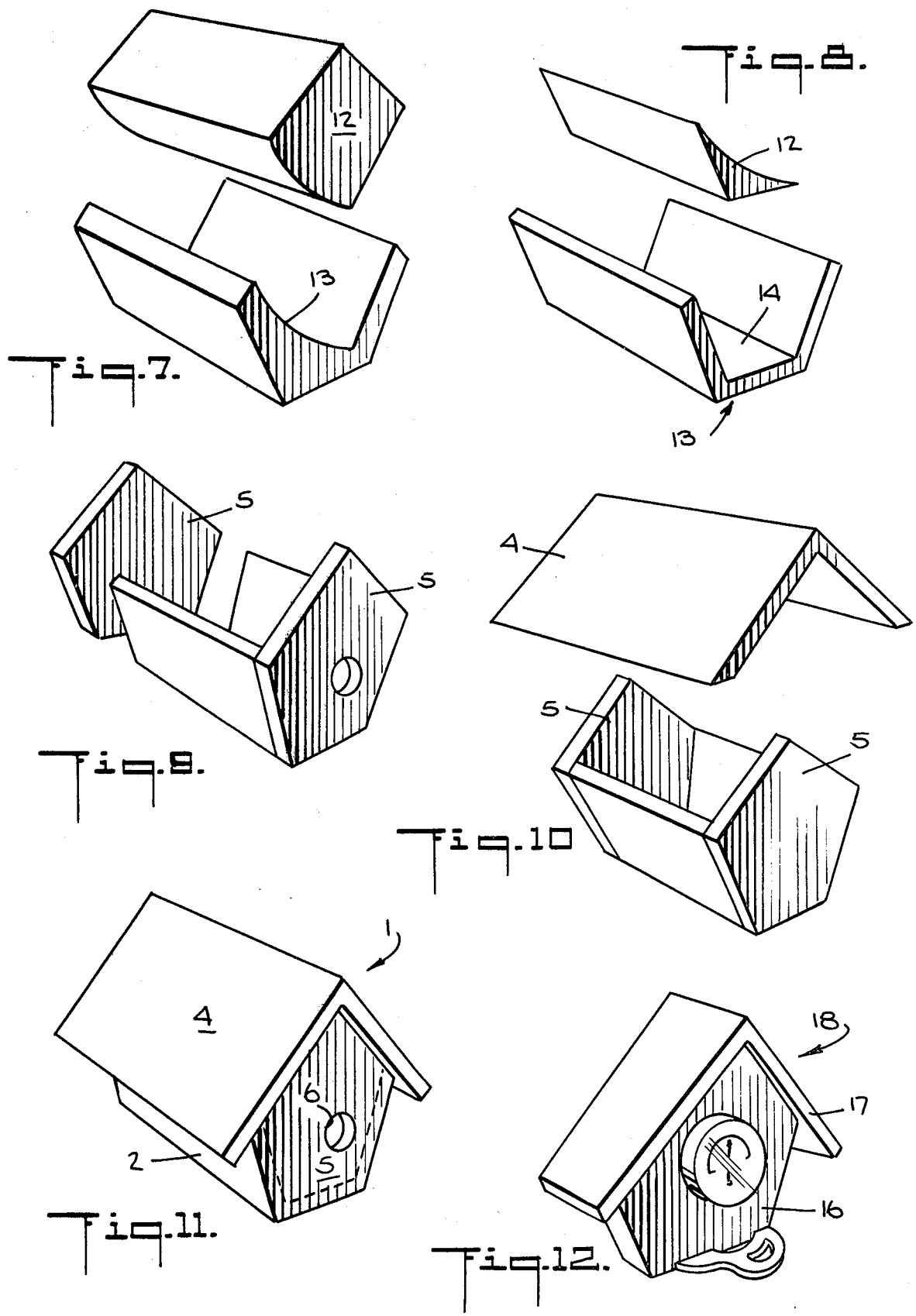

BIRD HOUSE AND METHOD OF MAKING SAME

BACKGROUND OF THE INVENTION

The present invention relates to a novel method of making articles by a series of cutting steps on a solid block or log without waste and to the products formed by the method such as bird houses, puzzles or other articles.

A significant portion of the cost of manufacturing wooden articles such as toys or toy-like articles is found in the specialized materials required as well as in the labor required in handling these materials in completing the articles. The method of the present invention provides for significant savings in both the material and the manufacturing time by employing a novel succession of simple cutting steps as applied to readily available and adaptable materials as further described below.

The method of the present invention will be described in connection with the manufacture of a bird house or house-like toy or puzzle formed from a cylindrical section of timber such as a log or section of a tree truck. The following description indicates how a useful end product is obtained using a simple manufacturing operation comprising a succession of cutting steps by which a cylindrical log is converted into an end product such as a bird house.

Accordingly an object of the present invention is to provide an improved method of manufacturing articles from inexpensive and readily available materials.

Another object of the present invention is to provide an inexpensive and useful product manufactured from readily available and inexpensive material principally using cutting steps.

Another object of the present invention is to provide an inexpensive and easily manufactured bird house or toy or toy-like article.

Another object of the present invention is to provide a method of producing wooden articles with a minimal waste of the material.

Other and further objects of the present invention will become apparent upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIGS. 2 through 8 illustrates a succession of cutting steps in the formation of the bird house or similar toy-like article.

FIGS. 9 through 11 illustrates a series of assembly steps by which the portions formed during the cutting operations are assembled into the bird house.

FIG. 12 illustrates a typical use for remaining portions of the log not utilized for the principal product such as the bird house.

DESCRIPTION OF PREFERRED EMBODIMENTS

Figure 1:
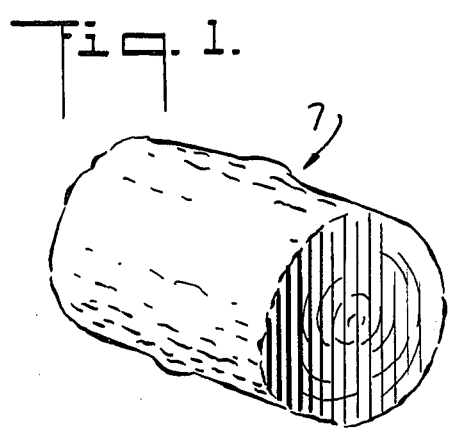
FIG. 1 is a perspective view of a typical log or other cylindrical wooden article on which the method is performed.

A preferred embodiment of the method will be described with particular reference to the manufacture of a bird house or toy-like house from a cylindrical section 7 of a tree trunk or log. The product resulting from the method, as illustrated in FIG. 11, is the hollow bird house 1 with side walls 2 extending upwardly from a bottom 3 and with the pitched roof 4 covering the side walls 2 and spaced end walls 5. An entry way, such as an aperture 6, is provided in one end wall 5.

Figure 2:
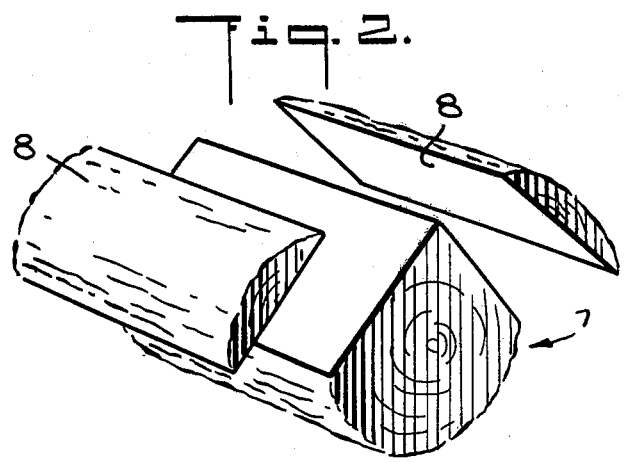
Figure 3:
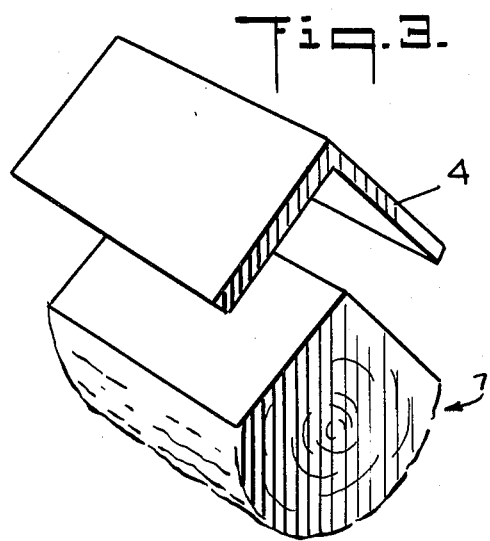
Figure 4:
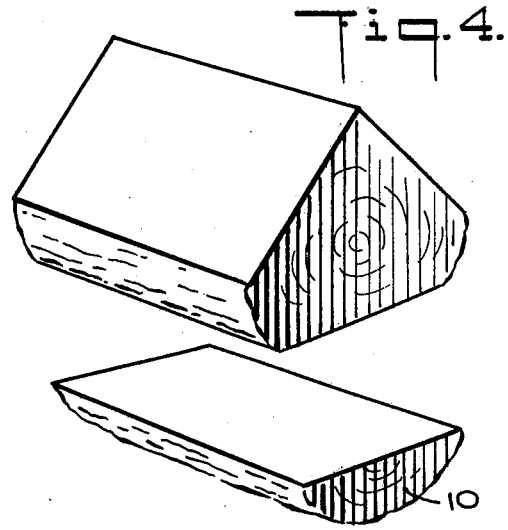
Figure 5:
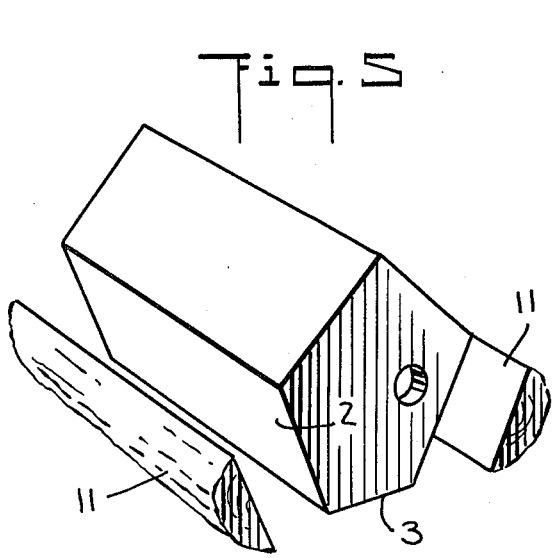
Figure 6:
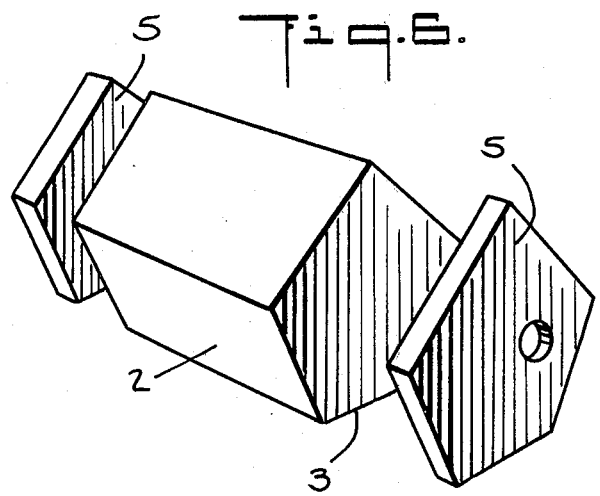

FIGS. 1 through 8 show the preferred succession of cutting steps which produce the house 1 of FIG. 11 with little or no waste material. The cutting steps are seen, in general, to comprise direct or straight cuts through the log section 7 such as might be performed with a manual or power saw or other cutting tools. The steps are begun, as illustrated in FIG. 2, by two diagonal cuts though the log 7 which are angularly aligned to one another removing two wooden pieces 8 of arcuate cross-section and leaving the upper surfaces of the house roof 4. Thereafter, the one piece pitched roof 4 is formed, as shown in FIG. 3, by two additional and intersection cuts which remove the roof 4 from the remaining portion of the log 7. Next, additional cuts on the bottom (FIG. 4) and on opposite sides of the remaining portion of the log 7 (FIG. 5) define the bottom 3 and side walls 2 of the house 1 and result in the additional extra bottom and side pieces 10 and 11. Next two transverse cuts are made in the remaining section 12 (FIG. 6) of the log for forming the end walls 5 of the house 1. In order to provide an overhang for the roof 4, two additional cuts are made to provide for the lesser length of the side walls 2 and bottom 3. It remains now only to hollow out the remaining center portion 12 of the log 7 by making three additional cuts (FIGS. 7 and 8), which are preferably preceeded by an arcuate at 13 to facilitate the bottom cut 14. These sucessive cuts have now produced a bird house formed from four principal sections, i.e. the roof 4, the body portion comprising side walls 2 and bottom 3, and the end walls 5. The entry 6 is cut in one of the end walls 5.

At this point, a bird house 1 has been formed which may be fastened together or otherwise finished. Alternatively, a puzzle or toy has been created which may be completely reassembled with the original cylindrical log being reconstructed using the portions resulting from the above described cutting steps.

By reference to FIG. 1 it is clear that all of the material is useful in this regard with the exception of that material specifically removed in the formation of the several cuts.

Separate pieces 15 and 16 (FIGS. 7 and 8) result from these cuts.

As prescribed above, the original log 7, has been cut into the necessary pieces from which the bird house 1 is formed and there remain in addition to these pieces various other portions removed from the original log 7. By reversing the above described cutting and separating steps, all of the removed pieces may be put back together to reconstruct the original cylindrical log 7. Therefore, not only has an efficient method of forming a hollow house been described, but a toy-like article has also been provided as an attractive and interesting puzzle for a child.

A series of simple steps are employed described provides not only a hollow house-like article, but also provides a method of producing a puzzle toy which utilizes all of the material present in the original log.

In the event that the method is used in the production of the hollow house or bird house, there will remain the several removed also usefully employed in the formation of other products.

FIG. 12, for example, illustrates the utilization of the end piece 16 such as is removed during the shortening steps for the house 1 in producing the roof 4 overhang. A short roof section 17 may be obtained from roof 4.

These shaped and house-like portions are utilized to form a wall plaque 18 or other decorative item to mount a barometer, theremometer, etc.

It will be seen that a novel manufacturing method has been described for producing useful articles from inexpensive materials such as log sections or a similar material and that the manufacturing method itself is simple and characterized an almost total elimination of waste material.

This results in the provision of a simple and efficient manufacturing operation as well as in the production of useful and relatively inexpensive by manufactured products.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention I claim:

1. A method forming a bird house from a solid generally cylindrical log comprising the steps of dividing the said log into a plurality of separated nesting sections by a plurality of generally straight cuts, forming a separate house roof section, end wall sections, and a combined side and bottom wall section, and combining the sections to form the bird house.

2. The method as claimed in claim 1 in which the steps of forming the house roof section comprises making four straight cuts.

3. The method as claimed in claim 1 in which the steps of forming the roof section comprises making two straight intersecting cuts to form the outer roof surfaces and making two straight intersecting cuts to form the inner roof surfaces.

4. A bird house formed from a generally cylindrical log comprising a plurality of separated nesting sections formed by a plurality of generally straight cuts forming a separate house roof section, end wall sections, and a combined side and bottom wall section, said sections combining to form the bird house.

5. The article as claimed in claim 4 in which the house roof section comprises four straight cuts.

6. The article as claimed in claim 4 in which the roof section comprises two straight intersecting outs forming the outer roof surfaces and two straight intersecting cuts forming the inner roof surfaces.

* * * * *